Aug. 7, 1934.     J. A. LE CAIN     1,969,020
STEAM ENGINE VALVE GEAR
Filed March 8, 1929
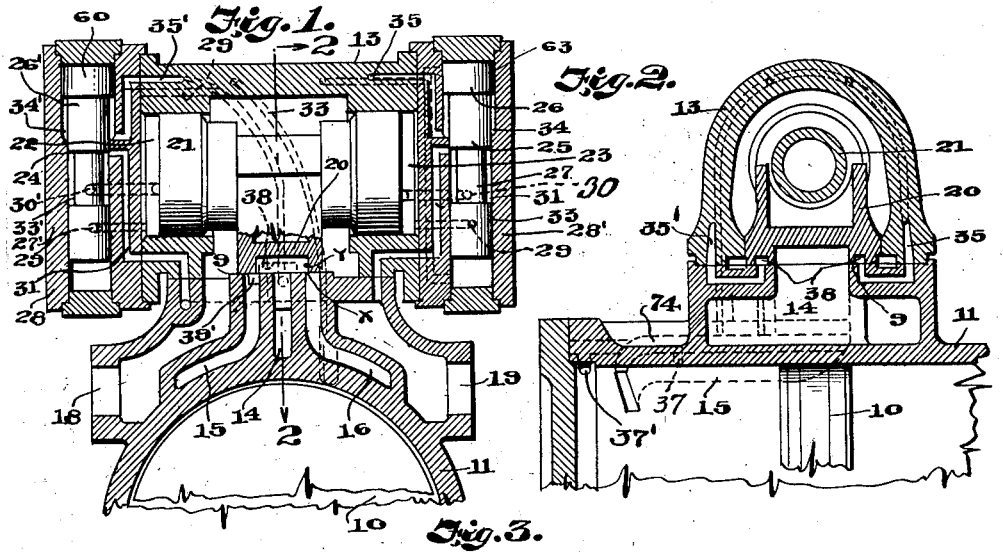
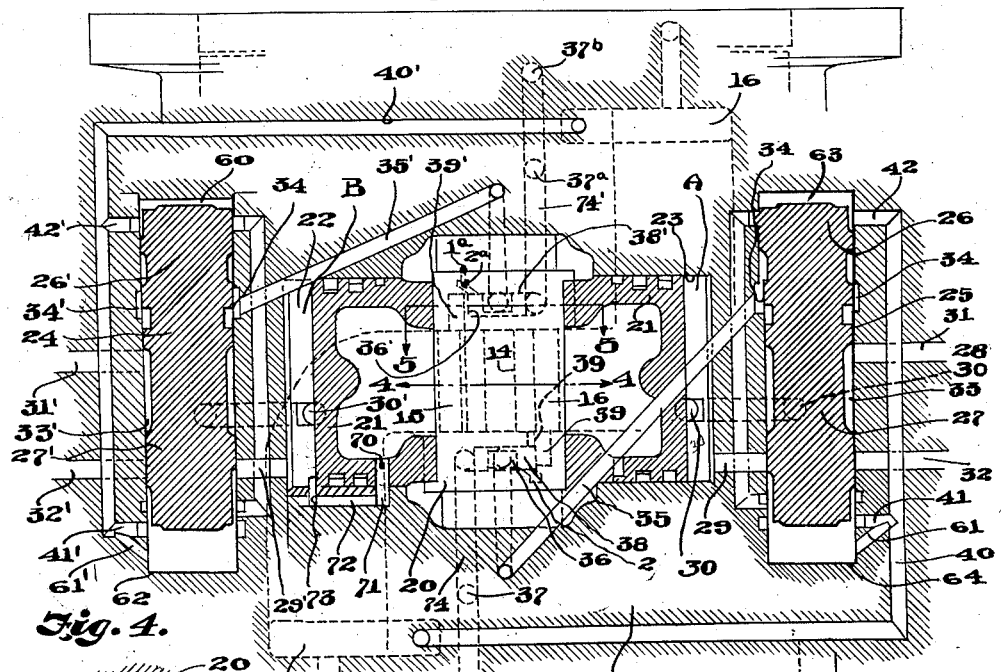
John A. Le Cain.
INVENTOR
BY
ATTORNEY Patented Aug. 7, 1934

1,969,020

UNITED STATES PATENT OFFICE 1,969,020

STEAM ENGINE VALVE GEAR

John A. Le Cain, East Orange, N. J.

Application March 8, 1929, Serial No. 345,367

1 Claim. (Cl. 121—158)

This invention relates to valve gear for fluid pressure engines and more particularly to internal valve gear for steam pumping engines in which a pressure actuated main valve, governing the distribution of steam or pressure fluid to the opposite sides of the working piston, is controlled by pressure actuated auxiliary valves. In constructions of this type, difficulty arises in starting, when the main valve happens to be stopped in center position, thereby preventing the passage of steam to one end or the other of the main cylinder.

The object of the present invention is to provide an improved construction of valve gear of this type, designed so that, should the main valve stop in center position and the pressure actuated auxiliary valves stop in such a position that the pressure in chambers at the ends of the main valve plunger is less than pump operating pressure in the main chest, pressure fluid from the main chest will be admitted at one end of the main valve sufficient to move it from its center position, upon the turning on of the pressure fluid.

With these and other objects in view, as may appear from the accompanying specification, the invention consists in various features of construction and combination of parts, which will be first described in connection with the accompanying drawing, showing a steam engine valve gear of the preferred form embodying the invention, and the features forming the invention will be specifically pointed out in the claim.

In the drawing:

Fig. 1 is a sectional view of the valve gear taken transversely to the steam cylinder.

Fig. 2 is a section on the line 2—2 of Fig. 1.

Fig. 3 is a diagrammatic lay-out of the valve gear and ports.

Fig. 4 is a fragmentary detail sectional view on the line 4—4 of Fig. 3.

Fig. 5 is a fragmentary detail section taken on the line 5—5 of Fig. 3.

Referring more particularly to the drawing, the following will be a brief description of the construction and operation of one form of valve gear of the above type, which is preferably that of my previous patents, Nos. 1,390,625 and 1,577,914, following which will be a specific description of the improvement embodied in the present application.

The main piston 10 is reciprocated within the cylinder 11 by steam directed to one end or the other of the cylinder 11 through ports and passages 15 and 16 which serve alternately as induction and exhaust ports and passages, according to the position of the main slide valve 20 which reciprocates upon a valve seat 9 provided with the usual exhaust port and passage 14. A steam chest 13 encloses the valve seat 9 and receives steam through a supply passage 18 connecting with the interior thereof, and the exhaust port and passage 14 connects with a port 19 for the discharge of the exhaust steam. The main slide valve 20 is reciprocated by a plunger 21, the opposite ends of which reciprocate in cylinders 22 and 23 formed at opposite ends of the steam chest 13.

Equal pressures are normally exerted against the opposite ends of the plunger 21 so that it is maintained in any position to which it is moved. The reciprocation of the plunger 21 is due to the unbalanced pressures at opposite ends thereof caused by alternately shutting off the steam supply to one or the other of the cylinders 22, 23 and simultaneously opening that same cylinder to exhaust.

This operation is accomplished under the control of two auxiliary valves 24 and 25, which reciprocate in auxiliary valve casings 28—28' secured to opposite ends of the steam chest 13. Since these auxiliary valves are identical in construction and operation, it will only be necessary to describe the valve 25. The auxiliary valve 25 is provided at its top with an enlarged head 26 and near its lower end with a reduced portion 27. The auxiliary cylinder 23 is connected to the interior of the auxiliary valve casing 28' by an inlet passage 29 and an exhaust passage 30, and the interior of the casing 28' is connected by a passage 31 with the main exhaust passage 19 and provided with a supply passage 32 connecting with the interior of the steam chest 13. The several ports and passages just described are so located relatively to each other and the reduced portion 27 that when the valve 25 is in its lowermost or normal position steam is admitted to the adjacent cylinder 23 through the passage 32, the annular space 33 around the reduced portion of the valve 25 and passage 29 while communication is obstructed between the exhaust passage 30 and the passage 31. When the valve 25 is raised to operative position the passages 29 and 32 are disconnected, thus shutting off the supply of steam to the cylinder 23 while communication is established between the exhaust passages 30 and 31, thus exhausting the steam from cylinder 23.

The auxiliary valve 25 is raised into operative position by the admission of steam from the main cylinder 11 to an annular space 34 formed beneath the head 26 of the valve through a passage 35 which terminates in a flaring port 36 in one side of the slide valve seat 9 adjacent to the upper end of a passage 74 which opens at 37 and 37' into the main cylinder 11 (near the left end thereof, as shown in Fig. 2.) A groove 38 in the under face of the main slide valve 20 connects the valve seat terminals of the passages 35 and 74 when the main valve is in its extreme position toward the left (Fig. 3) so that live steam from the right side of the piston 10 may pass to the space 34 and quickly cause the operative stroke of the auxiliary valve 25 when the main piston in its stroke to the left opens the passage 37 to the live steam driving the main piston 10. The operative stroke of the auxiliary valve 25, as previously stated, shuts off the flow of live steam to the auxiliary cylinder 23 and simultaneously opens said cylinder to exhaust thus unbalancing the pressures in the auxiliary cylinders 22 and 23, whereby the plunger 21 moves to the right carrying with it the main valve 20 for the delivery of steam to the left end of the main cylinder for the reversal of the main piston 10.

Movement of the main valve 20 to the right connects the flaring port 36, valve seat terminal of the passage 35, through groove 38, with a lateral extension 39 of the port and passage 16 which, being now connected to the exhaust passage 14, allows the steam to exhaust from the space 34 beneath the head 26 of the auxiliary valve 25. Simultaneously live steam is passed from port and passage 15 through passage 40 and ports 41 and 42 to the top and the bottom of the auxiliary valve 25 whereby the valve is positively and gently forced down to its normal position by reason of the difference of area between the top and bottom surfaces of the valve.

The auxiliary valve 24 is the same in structure as the auxiliary valve 25 and is connected with the main cylinder and the exhaust passage by means of a series of passages identical in formation and arrangement with the passages connected with the auxiliary valve 25 and are designated by corresponding reference numerals primed, with the sole exception of the passage 37 and its opening 37' which are marked respectively 37a and 37b. Wherefore, the movement of the main valve to the right connects the space 34' under the head 26' of the valve 24 with the opposite end of the cylinder through passage 35', 74', 37a and groove 38' on the opposite side of the valve seat 9, so that when the piston 10 in its movement to the right uncovers the passage 37a, the auxiliary valve 24 undergoes the same operation as above described in connection with the auxiliary valve 25 to produce an opposite movement of the plunger 21 and the main valve 20 to secure a reversal of the main piston 10.

In order to move the plunger 21 from center position, should it accidentally stop on dead center, with the auxiliary valves 24 and 25 in their normal relative positions, I provide the main valve 20 with a steam lap $x$ and a negative exhaust lap $y$ as shown in Fig. 1, so that, when the main valve 20 is in its dead center position, steam will not pass to either of the passages 15 and 16, and these passages will be under the same pressure, that is, exhaust pressure, as they will be connected to each other and the exhaust passage 14 by the negative exhaust lap $y$. Since passages 40, 40' connect respectively with the passages 15, 16, the top and bottom of each of the auxiliary valves 24 and 25 will be under exhaust pressure. In order to assure movement of one or the other of the auxiliary valves 24 and 25 on turning on the steam, I provide the main valve seat 9 with a passage 1a connecting with the steam chest 13 and at one end of the groove 38' in the main valve 20 a slot, respectively, 2 and 2a adapted to connect with the passage 1a when the main valve 20 is in its dead center position.

When the steam is turned on it passes through the passage 1a, the slot 2a, groove 38' and passage 35' to the space 34' beneath the head 26' of the auxiliary valve 24, thereby causing valve 24 to raise to its highest position thus forcing main valve 20 from its dead center position and delivering steam to port 16 of the main cylinder 11, whereby the valve gear will resume its normal operation as previously set forth.

If the main steam valve or plunger 21 should be stalled to the left of the dead center so that there will be a slight steam opening to port 16, which leads to the top of the steam cylinder, this pressure on port 16 will also be on the top in the cylinder space 60 and bottom through slot 61' and space 62 of the left hand reversing valve 24. The top space 63 and the bottom space 64 of the right hand reversing valve 25 will be connected to the port 15, which is at exhaust pressure. The center of the right hand reversing valve 25 will be connected to the port 37 and 37' in the steam cylinder bore by the position of the slot 38 on the main steam valve face 20. The pressure difference in the ends of the steam cylinder will cause the piston 10 to be moved until the port 37 is opened by the steam piston. Pressure from the steam cylinder 11 will then flow by way of the slot in the main valve face to differential area 34, forcing the right hand reversing valve 25 up, exhausting the space A, and as the left hand reversing valve 24 is in its lowest position, steam will flow to the chamber B and cause the main steam valve 21 to move from its central position.

If the main steam valve 21 should be stalled to the right of the dead center so that there will be a slight steam opening to port 15, which leads to the bottom of the steam cylinder 11, this pressure in the port 15 will also be on the top and bottom of the right hand reversing valve 25. The top and bottom of the left hand reversing valve 24 will be connected to port 16, which is at exhaust pressure. The center of the left hand reversing valve 24 (if not controlled by steam pressure port 34') will be connected to port 37a and 37b in the steam cylinder 11 by the position of the slot 38' on the main steam valve face. The pressure difference in the ends of the steam cylinder will cause the piston to be forced up until the port 37a is opened by the steam piston. Pressure from the steam cylinder bore 11 will then flow by way of the slot 35' on the main valve face to differential area 34', forcing the left hand reversing valve 24 up, exhausting the chamber B, and, as the right hand reversing valve 25 is in its lowest position, steam will flow to the chamber A, causing the main steam valve 21 to move from its central position.

The present invention embodies a specific difference from the structure shown in Patent 1,577,914 other than the provision of slots on the main valve face so located as to cause one of the valves 24 or 25 to raise when steam pressure from passage 1a or from ports 37 and 37a in the steam cylinder bore 11 connects to chambers 34 and 34' under auxiliary valve heads, in that the piston or plunger 21 and plunger bore are provided with passages 70, 71, 72 and 73, provided to permit passage of steam or pressure fluid to move the valve piston 21 off dead center when both the right and left hand auxiliary valves are in the upper position.

If the main steam valve 21 should be on the center line or dead center and both reversing valves 24 and 25 stick in their upper position, the chambers A and B will be connected to the exhaust ports 30 and 30', areas 33 and 33' around the reversing valves, will be connected to the exhaust ports 31 and 31', steam will flow through the passages 70, 71, 72 and 73 to the chamber B. The pressure in the chamber B due to the flow of steam through the passages 70, 71, 72 and 73, is regulated by the difference in areas of the passages 72 and 30'. The steam flowing through the passages 70, 71, 72 and 73 into the chamber B will increase the pressure in the chamber B sufficiently to force the plunger or main steam valve piston 21 to the right against the back pressure in the chamber A.

It will be understood that the invention is not to be limited to the specific construction or arrangement of parts shown but that these may be modified widely within the invention defined by the claim.

What is claimed is:

A fluid pressure engine comprising a cylinder a main valve plunger in the cylinder so located as to form spaces at the ends of the plunger, two separate auxiliary valves, means controlled by said auxiliary valves for admitting live steam to normally maintain live steam pressure upon opposite ends of the plunger, means controlled by each of the auxiliary valves for momentarily relieving the steam pressure upon one end of the plunger, and passages for applying increased pressure at one end of the main valve plunger when the main valve plunger is stopped with the spaces at its ends connected to the exhaust.

JOHN A. LE CAIN.